United States Patent
Leiba et al.

(10) Patent No.: US 8,374,263 B2
(45) Date of Patent: Feb. 12, 2013

(54) OFDM COMMUNICATION WITH MULTI-DIMENSIONAL RATE ADAPTATION

(75) Inventors: Yigal Leiba, Holon (IL); Baruch Schwarz, RaAnana (IL); Izhak Kirshenbaum, Rosh HaAyin (IL); Elad Dayan, Beit-Dagan (IL)

(73) Assignee: Siklu Communication Ltd., Petach-Tikva (IL)

( * ) Notice: Subject to any disclaimer, the term of this patent is extended or adjusted under 35 U.S.C. 154(b) by 679 days.

(21) Appl. No.: 12/616,795

(22) Filed: Nov. 12, 2009

(65) Prior Publication Data

US 2011/0110410 A1    May 12, 2011

(51) Int. Cl.
*H04L 27/28* (2006.01)
(52) U.S. Cl. .................................................. 375/260
(58) Field of Classification Search .............. 375/260, 375/130, 147, 272, 259, 271; 333/239; 455/91
See application file for complete search history.

(56) References Cited

U.S. PATENT DOCUMENTS

| | | | |
|---|---|---|---|
| 6,493,331 | B1 | 12/2002 | Walton et al. |
| 7,164,649 | B2 | 1/2007 | Walton et al. |
| 7,606,195 | B2 | 10/2009 | Wang et al. |
| 2003/0086371 | A1 | 5/2003 | Walton et al. |
| 2004/0156312 | A1* | 8/2004 | Salonidis et al. ............ 370/229 |
| 2007/0147251 | A1 | 6/2007 | Monsen |
| 2007/0293256 | A1* | 12/2007 | Merched et al. ............ 455/504 |
| 2008/0043860 | A1 | 2/2008 | Moffatt |
| 2008/0043861 | A1 | 2/2008 | Moffatt |
| 2008/0291990 | A1 | 11/2008 | Yoshida et al. |
| 2009/0060014 | A1 | 3/2009 | Beadle |
| 2009/0060015 | A1 | 3/2009 | Beadle |
| 2009/0181687 | A1 | 7/2009 | Tiirola et al. |
| 2009/0245084 | A1 | 10/2009 | Moffatt et al. |
| 2009/0245397 | A1 | 10/2009 | Moffatt et al. |
| 2010/0265895 | A1* | 10/2010 | Bracha ........................ 370/329 |

FOREIGN PATENT DOCUMENTS

WO    WO 2011/058476    5/2011

OTHER PUBLICATIONS

Das "Techniques to Enhance Spectral Efficiency of OFDM Wireless Systems", Dissertation, Presented to the International Doctoral School of Technology and Science in Partial Fulfillment of the Requirements for the Degree of Doctor of Philosophy, Aalborg University, Denmark, Sep. 7, 2007.
Falconer et al. "Coverage Enhancement Methods for LMDS", IEEE Communications Magazine, 41(7): 86-92, Jul. 2003.
Shoji et al. "Millimeter-Wave OFDM WPAN System Applying Adaptive Modulation for Grouped Sub-Carriers", Radio and Wireless Symposium Jan. 9-11, 2007, IEEE, p. 499.
Alcatel-Lucent "Alcatel-Lucent 9500 Microwave Packet Radio", Alcatel-Lucent, 2009: 2 pages.
BridgeWave "80 GHz Wireless", BridgeWave Communications, Inc., 2009: 2 pages.
BridgeWave "FlexPort 80 GHz SDH/SONET", BridgeWave Communications, Inc., 2009: 3 pages.

(Continued)

*Primary Examiner* — Khai Tran (57) ABSTRACT

A method for performing rate adaptation of millimeter wave transmissions in a substantially line-of-sight OFDM outdoor system over a radio frequency (RF) channel includes the following. First a channel quality estimator indicative of a quality of an outdoor millimeter-wave RF channel is received. A sequence of parameter changes is defined to dynamically adjust transmission quality for the rate adaptation. The rate adaptation includes dynamic adaptation of bandwidth and at least one other parameter. The sequence is stored as a table of vectors, each vector comprising a combination of parameters where one of parameters is bandwidth. The parameter vectors in the table are dynamically worked through in response to the channel quality estimator.

24 Claims, 5 Drawing Sheets

OTHER PUBLICATIONS

Ceragon "Carrier Ethernet Systems—FibeAir® IP-10", Ceragon, 1 page.
Ceragon "Carrier Ethernet Systems—FibeAir® IP-MAX$^2$ (G)", Ceragon, 1 page.
Comotech "AirLight TE1000C", Comotech Corporation, 2009: 1 page.
DragonWave "Horizon Compact Wireless Ehternet", DragonWave, 2004-2009: 1 page.
E-Band "E-Link 1000", E-Band Communications Corporation, 2006-2008: 2 pages.
E-Band "E-Link 1000EXR", E-Band Communications Corporation, 2006-2008: 2 pages.
Elva-1 "PPC-1000 Series. Gigabit Ethernet MM-Wave Link", ELVA-1 Ltd, 2008: 2 pages.
Ericsson "Mini-Link for ETSI", Ericsson, 2 pages.
GigaBeam "Gigabeam Gi-CORE Line", GigaBeam.com, 2009: 2 pages.
Harris Stratex "Eclipse™ Packet Node—Enabling the 4G Mobile Broadband Future", Harris Stratex Networks, Inc., 2009: 2 pages.
HXI LLC "HXI, Gigalink 7651e", HXI Millimeter Wave Products, 2008: 2 pages.
HXI, LLC "HXI, Gigalink 7451e", HXI Millimeter Wave Products, 2008: 2 pages.
LightPointe "AireBeam G70 Series", LightPointe, 2009: 2 pages.
Loea "L1000 Gigabit Wireless Link", Loea Corporation, 2008: 2 pages.
Loea "L2710 Gigabit Wireless Link", Loea Corporation, 2008: 2 pages.
NEC "Pasolink NEO", NEC Corporation, 1994-2009, 2 pages.
Nokia Siemens "Microwave Radio—Decoupling Cost from Capacity", Nokia Siemens Networks 2007-2009, 1 page.
Solectek "SkyWay-EB Series Gigabit Backbone Link", Solectek, 2007: 2 pages.

* cited by examiner

OFDM COMMUNICATION WITH MULTI-DIMENSIONAL RATE ADAPTATION

FIELD AND BACKGROUND OF THE INVENTION

The present invention, in some embodiments thereof, relates to OFDM communication with rate adaptation and, more particularly, but not exclusively, to OFDM communication with multi-dimensional rate adaptation at millimeter wave frequencies.

Millimeter wave communications operate in the Extremely High Frequency (EHF) radio frequency band of 30 to 300 gigahertz (GHz). Compared to lower bands, terrestrial radio signals in the millimeter-wave (mm-wave) band are extremely prone to atmospheric attenuation, such as rain fade and humidity. Due to the small wavelength at these frequencies, modest size antennas may have a small beam width. Therefore, outdoor mm-wave communication systems often operate over line-of-sight (LOS) channels OFDM is a frequency-division multiplexing scheme utilizing digital multi-carrier modulation. In OFDM the total frequency band is subdivided into several parallel data streams, using closely-spaced orthogonal sub-carriers to carry data. Each of these sub-carriers may be modulated independently. However, OFDM suffers from decreased robustness to phase noise (PN) and high Peak-to-Average Power Ratio (PAPR) relative to single-carrier techniques.

One of the advantages of OFDM is its ability to overcome the multi-path propagation associated with the wireless channel. OFDM has had no perceived advantages for LOS channels which do not suffer from multi-path propagation difficulties. Since OFDM has PN and PAPR disadvantages, mm-wave systems typically use single-carrier modulation techniques such as BPSK, QPSK and OOK.

Outdoor links present additional difficulties. Outdoor links should work even during worst case weather and interference conditions. One current solution for maintaining the link during worst case conditions is to operate with extreme modulation parameters such as: minimum bandwidth, low modulation, excessive error correction code and some repetitions. Such parameters yield very low throughput compared to the throughput that can be achieved in better conditions which exist most of the time. Additionally, the complex error correction required during poor channel conditions places an excessive burden on the computing power of the modem.

Rate adaptation is a technique used for overcoming changes in channel conditions. Rate adaptation dynamically adjusts the modulation parameters, such as the modulation type, coding and other signal and protocol parameters, according to the current transmission quality on the radio frequency (RF) channel. However, implementing rate adaptation in OFDM communications is particularly difficult due to the large number of modulation parameters (i.e. degrees of freedom) which can be dynamically controlled.

The Flexport Ethernet Wireless Links, by BridgeWave Communications Inc., utilize QPSK/BPSK modulation with adaptive modulation. In mm-wave systems the RF channel may be hundreds of megahertz (MHz) wide. Conventional modulation schemes, such as QPSK and BPSK, introduce dispersion into the signal passed through the channel. When operating over a very wide channel, QPSK/BPSK systems have difficulty maintaining the channel flat in frequency and phase.

U.S. Pat. No. 7,164,649 to Walton et al. presents techniques to adaptively control the rate of a data transmission in a wireless (e.g. OFDM) communication system. Various metrics may be used to select the proper rate for the data transmission, such as different characteristics of the communication channel or the performance of the data transmission.

"Millimeter-wave OFDM WPAN system applying adaptive modulation for grouped sub-carriers" by Shoji et al. (Radio and Wireless Symposium, 2007 IEEE, Jan. 9-11, 2007) presents a millimeter-wave OFDM modulation technique for an indoor channel.

SUMMARY OF THE INVENTION

OFDM is a frequency-division multiplexing scheme which independently modulates a group of closely-spaced orthogonal sub-carriers. The embodiments below define a sequence of parameter changes which are stored as parameter vectors. The stored parameter vectors are used to perform rate adaptation of the OFDM transmission, in order to dynamically respond to changes in the channel quality. Multi-dimensional rate adaptation may be performed by including more than one parameter in the parameter vectors, thereby adapting multiple parameters simultaneously.

According to an aspect of some embodiments of the present invention there is provided a method for performing rate adaptation of millimeter wave transmissions in a substantially line-of-sight OFDM outdoor system, wherein the millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for the rate adaptation, the parameters defining the rate adaptation, and comprising dynamic adaptation of bandwidth and at least one other parameter, storing the sequence as a table of vectors, one parameter of the vectors being bandwidth, each vector comprising a combination of parameters, and dynamically working through the parameter vectors in the table in response to the channel quality estimator.

According to some embodiments of the invention, the at least one other parameter comprises one of: error correction rate, repetition rate, transmission power, modulation type, power amplifier (PA) backoff, number of OFDM sub-channels, sub-carrier repetitions, number of error correction iterations, selection of OFDM sub-carriers to be modulated and method of coding.

According to some embodiments of the invention, the sequence defines a predetermined granularity of the channel quality estimator.

According to some embodiments of the invention, the granularity is 1.0 dB.

According to some embodiments of the invention, the RF channel is line-of-sight.

According to some embodiments of the invention, the RF channel is near line-of-sight.

According to some embodiments of the invention, the method further comprises associating each one of the stored parameter vectors with a separate range of the channel quality estimator.

According to some embodiments of the invention, the associating comprises selecting for each of the ranges a parameter vector which maximizes a specified performance measure for the range.

According to an aspect of some embodiments of the present invention there is provided a method for performing rate adaptation of millimeter wave transmissions in a substantially line-of-sight OFDM outdoor system, wherein the millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for the rate adaptation, the parameters defining the rate adaptation and comprising dynamic adaptation of bandwidth, storing the sequence as a table of bandwidths, and dynamically working through the bandwidths in the table in response to the channel quality estimator.

According to some embodiments of the invention, the sequence defines a predetermined granularity of the channel quality estimator.

According to some embodiments of the invention, the RF channel is line-of-sight.

According to some embodiments of the invention, the RF channel is near line-of-sight.

According to an aspect of some embodiments of the present invention there is provided a method for performing rate adaptation of millimeter wave transmissions in a substantially line-of-sight OFDM outdoor system, wherein the millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for the rate adaptation, the parameters defining the rate adaptation, and comprising dynamic adaptation of power amplifier (PA) backoff and at least one other parameter, storing the sequence as a table of vectors, one parameter of the vectors being PA backoff, each vector comprising a combination of parameters, and dynamically working through the parameter vectors in the table in response to the channel quality estimator.

According to some embodiments of the invention, the at least one other parameter comprises one of: error correction rate, repetition rate, transmission power, modulation type, number of OFDM sub-channels, sub-carrier repetitions, number of error correction iterations, selection of OFDM sub-carriers to be modulated, method of coding and bandwidth.

According to some embodiments of the invention, the sequence defines a predetermined granularity of the channel quality estimator.

According to some embodiments of the invention, the RF channel is line-of-sight.

According to some embodiments of the invention, the RF channel is near line-of-sight.

According to an aspect of some embodiments of the present invention there is provided a method for performing rate adaptation of microwave transmissions in a substantially line-of-sight OFDM outdoor system, wherein the microwave transmissions are performed over a radio frequency (RF) channel, comprising:

receiving a channel quality estimator indicative of a quality of an outdoor microwave RF channel;

defining a sequence of parameter changes to dynamically adjust transmission quality for the rate adaptation, the parameters defining the rate adaptation, and comprising dynamic adaptation of bandwidth and at least one other parameter, storing the sequence as a table of vectors, one parameter of the vectors being bandwidth, each vector comprising a combination of parameters, and dynamically working through the parameter vectors in the table in response to the channel quality estimator.

According to some embodiments of the invention, the at least one other parameter comprises one of: error correction rate, repetition rate, transmission power, modulation type, power amplifier (PA) backoff, number of OFDM sub-channels, sub-carrier repetitions, number of error correction iterations, selection of OFDM sub-carriers to be modulated and method of coding.

According to some embodiments of the invention, the sequence defines a predetermined granularity of the channel quality estimator.

According to some embodiments of the invention, the RF channel is line-of-sight.

According to some embodiments of the invention, the RF channel is near line-of-sight.

According to an aspect of some embodiments of the present invention there is provided a method for performing rate adaptation of millimeter wave transmissions in an OFDM indoor system, wherein the millimeter wave transmissions are performed over a radio frequency (RF) channel, comprising:

receiving a channel quality estimator indicative of a quality of a millimeter-wave RF channel;

defining a sequence of parameter changes to dynamically adjust transmission quality for the rate adaptation, the parameters defining the rate adaptation, and comprising dynamic adaptation of bandwidth and at least one other parameter, storing the sequence as a table of vectors, one parameter of the vectors being bandwidth, each vector comprising a combination of parameters, and dynamically working through the parameter vectors in the table in response to the channel quality estimator.

According to some embodiments of the invention, the at least one other parameter comprises one of: error correction rate, repetition rate, transmission power, modulation type, power amplifier (PA) backoff, number of OFDM sub-channels, sub-carrier repetitions, number of error correction iterations, selection of OFDM sub-carriers to be modulated and method of coding.

According to some embodiments of the invention, the sequence defines a predetermined granularity of the channel quality estimator.

According to an aspect of some embodiments of the present invention there is provided an apparatus for controlling rate adaptation of transmissions in a substantially line-of-sight OFDM outdoor system, wherein the transmissions are performed over a radio frequency (RF) channel in the mm-wave or microwave frequency band, comprising:

a parameter sequence definer, configured for defining a sequence of parameter changes to dynamically adjust transmission quality for the rate adaptation, the parameters defining the rate adaptation, and comprising dynamic adaptation of bandwidth and at least one other parameter;

a vector database associated with the parameter sequence definer, configured for storing the sequence as a table of vectors, one parameter of the vectors being bandwidth, each vector comprising a combination of parameters;

a parameter vector selector associated with the vector database, configured for receiving a channel quality estimator indicative of a quality of an outdoor millimeter-wave RF channel, for dynamically working through the parameter vectors in the table in response to the channel quality estimator so as to select a parameter vector for modulating an RF carrier; and a processor configured for operating the parameter sequence definer, the vector database and the parameter vector selector.

According to some embodiments of the invention, the RF channel is line-of-sight.

According to some embodiments of the invention, the RF channel is near line-of-sight.

According to some embodiments of the invention, the apparatus further comprises an RF modulator configured for OFDM modulating a mm-wave RF carrier in accordance with the selected parameter vector.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS
OF THE INVENTION

The present invention, in some embodiments thereof, relates to OFDM communication with rate adaptation and, more particularly, but not exclusively, to OFDM communication with multi-dimensional rate adaptation operating at millimeter wave frequencies.

OFDM modulation provides the capability to operate over non-frequency-flat channels at bandwidths of hundreds of MHZ, as required by mm-wave communication. Embodiments presented herein perform multi-dimensional rate adaptation of OFDM transmissions in the mm-wave and microwave bands, in order to maintain high data throughput over a wide range of channel conditions. OFDM has a large number of modulation parameters, relative to single carrier modulation techniques (e.g. QPSK, BPSK, OOK, etc. . . . ). Each of these modulation parameters may potentially be dynamically adjusted for rate adaptation. The large number of degrees of freedom available with OFDM presents difficulties in selecting modulation parameter values during the course of signal transmission. In the embodiments presented below, each set of parameter values is considered a single vector. During transmission rate adaptation is performed by dynamically selecting parameter vectors from a preselected stored set, according to channel conditions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Some of the embodiments presented herein relate to an outdoor channel between the OFDM transmitter and OFDM receiver. However the embodiments are not limited to outdoor channels, and other embodiments are included for indoor channels as well.

Figure 1:
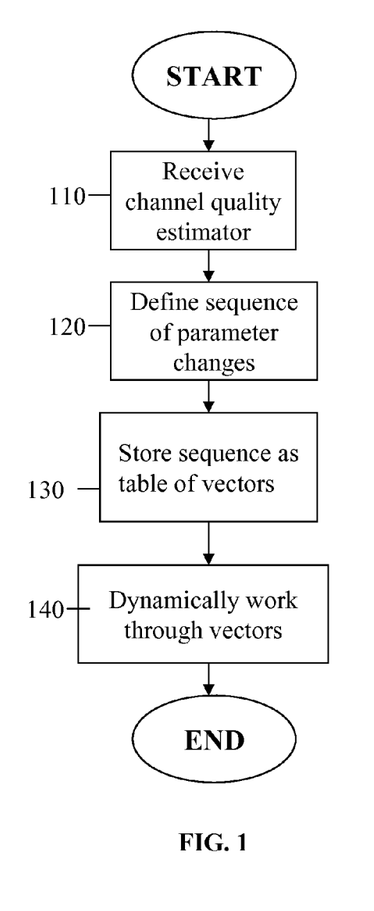
FIG. 1 is a simplified flowchart of a method for performing rate adaptation of millimeter wave transmissions in a substantially line-of-sight OFDM outdoor system, in accordance with an embodiment of the present invention.

Reference is now made to FIG. 1, which is a simplified flowchart of a method for performing rate adaptation of RF transmissions in a substantially line-of-sight OFDM outdoor system, in accordance with an embodiment of the present invention. In the present embodiments the transmissions are performed over an outdoor channel. In some embodiments the RF channel is a millimeter wave channel. In other embodiments the channel is a microwave channel.

In some embodiments the RF channel is line-of-sight. In other embodiments the RF channel is near line-of-sight (NLOS).

For clarity the following embodiments are described for a mm-wave channel. However it is to be understood that the embodiments may be implemented in a microwave channel as well.

In 110, a channel quality estimator indicative of a quality of an outdoor millimeter-wave RF channel is received. The channel quality estimator reflects the channel conditions, and is used to dynamically select the appropriate set of OFDM parameters for current channel conditions. In some embodiments the channel quality estimator is received from the OFDM receiver. The channel quality estimator may be derived from one or a combination of:
1) Signal-to-noise ratio (SNR)
2) Received-Signal-Strength-Indication (RSSI); and
3) A channel quality measurement (such as OFDM tone power spread).

In some embodiments the sequence is selected to optimize a specified measure of transmission quality (denoted herein the performance measure). The performance measure may include one or a combination of:
1) Dynamic range; and
2) Data throughput;

In some embodiments, the sequence defines a predetermined granularity of the channel quality estimator. In further embodiments the granularity is 1.0 dB, or even 0.5 dB.

The millimeter-wave RF band encompasses frequencies of 30 to 300 GHz. Although the embodiments presented herein are not limited to a specific band within the mm-wave band, possible operating frequency bands include all or portions of:
a. 54-86 GHz,
b. 71-76 GHz,
c. 81-86 GHz, and
d. 54-66 GHz.

In 120, a sequence of parameter changes is defined. The sequence of parameter changes dynamically defines the transmission quality during the adaptive rate OFDM transmission. An example of the parameter sequence definition process is described in more detail for FIG. 2 below.

In a first embodiment, the rate adaptation is multi-dimensional and the adapted parameters include bandwidth and at least one other parameter. Dynamic bandwidth adaptation may be performed in several ways. In a first embodiment, dynamic bandwidth adaptation is performed by controlling the number of energized OFDM sub-carriers. The bandwidth of each sub-carrier does not change, and the overall bandwidth is determined by the number of sub-carriers that are energized. In a further embodiment, the energized sub-carriers are placed together as one block about the center of the channel. In a second embodiment, bandwidth adaptation is performed by modifying the bandwidth of one or more of the sub-carriers themselves. Other embodiments adapt both the number of energized sub-carriers and the bandwidth of individual sub-carriers.

The additional parameter(s) selected for adaptation in addition to the bandwidth parameter may include one or more of:
a. Error correction rate,
b. Repetition rate,
c. Transmission power,
d. Modulation type,
e. Power amplifier (PA) backoff,
f. Number of OFDM sub-channels,
g. Sub-carrier repetitions,
h. Number of error correction iterations,
i. Selection of the OFDM sub-carriers to be modulated, and
j. Method of coding.

In other embodiments the adapted parameters are:
i) Bandwidth only, or
ii) PA backoff and at least one other parameter In some embodiments the sub-channels have the same number of equally spaced sub-carriers. However the internal structure of the sub-channels may vary. The sub-channel structure and/or sub-carrier spacing may be arranged to obtain the desired level of granularity.

In 130, the sequence is stored as a table of vectors. Each vector represents a member of the defined sequence. Preferably, each vector corresponds to a specified range of the channel quality estimator. In embodiments where only the bandwidth parameter is dynamically varied, the table contains a sequence of bandwidths.

In 140, the parameter vectors in the table are dynamically worked through in response to detected reception quality, as reflected by the channel quality estimator.

In one embodiment, when a new value of the channel quality estimator is received it is first determined whether the channel quality estimator is outside the range associated with the current parameter vector. If the channel quality estimator is outside the range, a new parameter vector is selected in accordance with the current value of the channel quality estimator.

After the parameter vector which is suitable for current channel conditions is selected, an OFDM millimeter-wave signal modulated in accordance with the selected parameter vector may be transmitted over the RF channel.

The above described embodiments are for an outdoor substantially line-of-sight system. Other embodiments perform multi-dimensional rate adaptation of millimeter wave transmissions in an indoor OFDM system. Other aspects of the above embodiments are substantially the same. Specifically, a channel quality estimator indicative of a quality of the millimeter-wave indoor RF channel is received. A sequence of parameter changes to dynamically define transmission quality for rate adaptation is defined. The parameters include bandwidth and at least one other parameter. The parameter sequence is stored as a table of vectors. The parameter vectors in the table are worked through dynamically in response to the channel quality indicated by the channel quality estimator.

Parameter Sequence Definition

Figure 2:
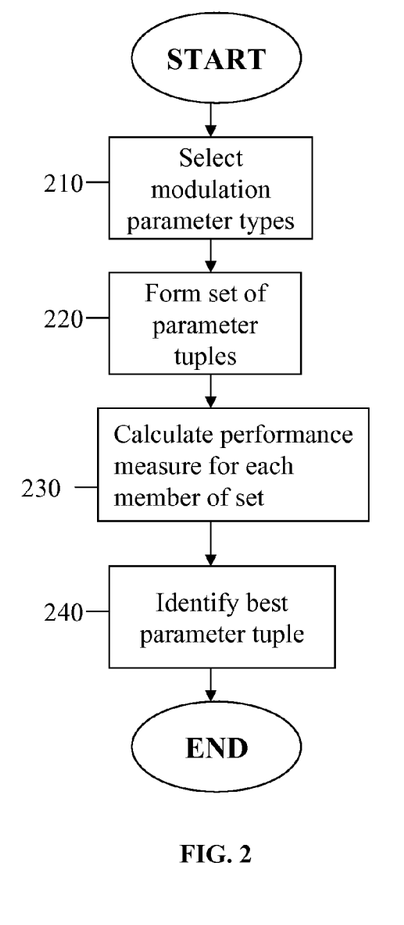
FIG. 2 is a simplified flowchart of a method for dynamically defining a sequence of parameter changes, in accordance with an embodiment of the present invention.

Reference is now made to FIG. 2, which is a simplified flowchart of a method for dynamically defining a sequence of parameter changes, in accordance with an embodiment of the present invention. In the present embodiment, the parameter sequence is selected based on a performance measure representing transmission quality, such as data throughput. The sequence may then be stored in vector form for use during the adaptive OFDM transmission (see 130 of FIG. 1).

In 210, the type of each modulation parameter which will be adaptively adjusted during transmission is selected. Both the type of parameter and the values which may be used for each type of parameter are selected.

In 220, a set which consists of all tuples of possible modulation parameters is formed. For example, if there are four parameters:
1) Bandwidth—either one or two sub-channels
2) Modulation type—either QPSK or 16QAM
3) FEC code rate—either ½ or ¾
4) Repetition—either 1 or 2 then a tuple would be {bandwidth, modulation, FEC-rate, repetition}, and 16 such distinct tuples are available for inclusion in the set. In the following each tuple is denoted a parameter vector.

In some embodiments not all available parameter vectors are included in the set. Some vectors may be excluded by a communication standard or may be impractical for other reasons. For example, the signal quality may improve to levels where the OFDM receiver computing power is not able to handle the full error correction algorithm. In this case, the parameter vectors may be limited to those which are suitable for a reduced complexity error correction algorithm which meets computing power constraints.

In 230, the performance measure is determined for each parameter vector in the set. The performance measure may be determined by any suitable technique, such as calculation, simulation or measurement.

In 240, the parameter vectors which gave the maximum value of the performance measure are identified. These parameter vectors form the sequence which is stored for use during the adaptive OFDM transmission. Each parameter vector is associated with a range of channel quality estimator values. The size of each range is preferably selected so as to provide the required granularity. Typically the granularity of the parameter vectors is greater or equal to the accuracy of the estimator.

The following embodiment presents a manual method for selecting the parameter vectors for inclusion in the set. Other embodiments implement a corresponding method automatically. In essence, the goal is to pass a monotonically increasing line between selected points on the graph, starting at the point having the lowest channel quality estimator (e.g. lowest SNR).

The performance of the method is as follows:

1) A graph whose X axis is the channel quality estimator and whose Y axis is the performance measure (e.g. relative-SNR vs. relative-rate) is formed, where each of the possible tuples is shown as a point on the graph.

2) The desired step size of the channel quality estimator is selected (for example between 0.9 dB and 1.1 dB).

3) Ranges of channel quality estimator are defined, starting at the point having the lowest value of the channel quality estimator and progressing in the direction of increasing channel quality estimator. The final range should include the point having the highest channel quality estimator value.

4) Within each window, the point having the best performance measure is identified. The located point is included in the set. All other tuples within the given window are discarded.

The above embodiment utilizes a step size which is the same for all ranges of the channel quality estimator. In other embodiments the step size may not be identical for each range. For example, the ranges may be modified to ensure that at least one tuple falls within each of the ranges.

Figure 3:
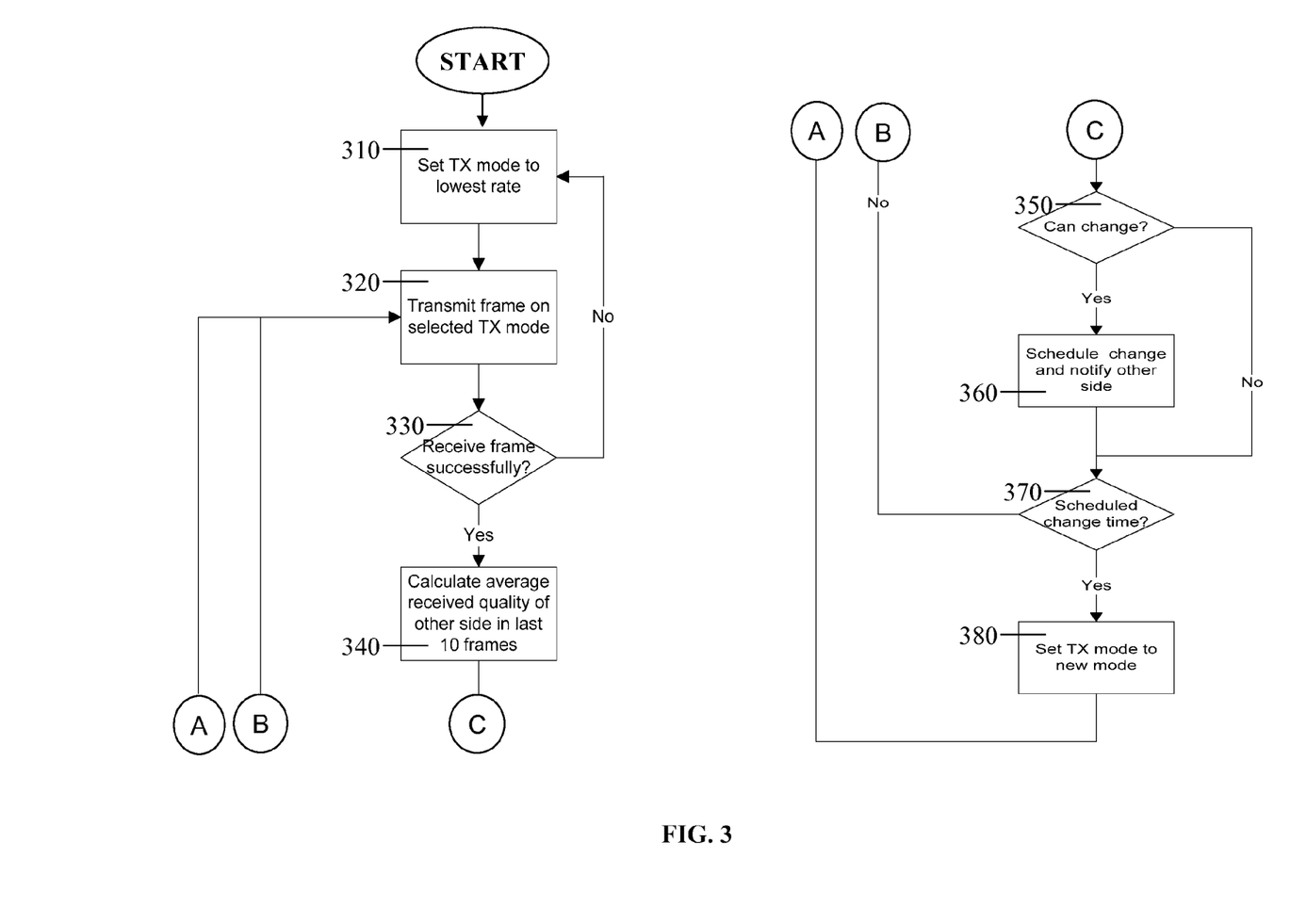
FIG. 3 is a simplified flowchart of OFDM transmission with rate adaptation, according to an exemplary embodiment of the present invention.

Reference is now made to FIG. 3, which is a simplified flowchart of OFDM transmission with multi-dimensional rate adaptation, according to an exemplary embodiment of the present invention. FIG. 3 describes the activities which are performed by both the OFDM receiver and OFDM transmitter, in order to ensure that both sides of the system are operating with the same parameter vector.

The performance of the method begins by assuming at startup that the worst case conditions are occurring. In 310 the parameter vector associated with the lowest range of the channel quality estimator is selected. This set will typically provide the lowest data throughput rate. In 320, a frame is transmitted using an OFDM signal modulated in accordance with the selected parameter vector.

In 330, it is determined whether the frame has been received successfully. If there has been a transmission failure, a new frame is transmitted 310. The new frame may include new data or may repeat the data that was transmitted unsuccessfully.

If the transmitted frame was received successfully, the average received quality over a number of the latest received frames (e.g. ten frames) is calculated 340. If the received quality is acceptable 350, a change of parameter vector is scheduled by either the OFDM receiver or OFDM transmitter, and the other side is notified of the change 360. If not acceptable, no change is scheduled and the next frame is transmitted 320. After startup, the average received quality of the frames is monitored continuously 330-340, and the parameter vector either upgraded or downgraded as necessary 350-380. When a scheduled change time occurs 370, the new parameter vector is implemented by both the OFDM transmitter and OFDM receiver and the next frame is transmitted 320.

In the exemplary embodiment described above, worst case conditions are assumed at startup. In other embodiments a different parameter vector is utilized at startup. The startup parameter vector may be predetermined, or may be selected according to current channel conditions or other variables.

Figure 4:
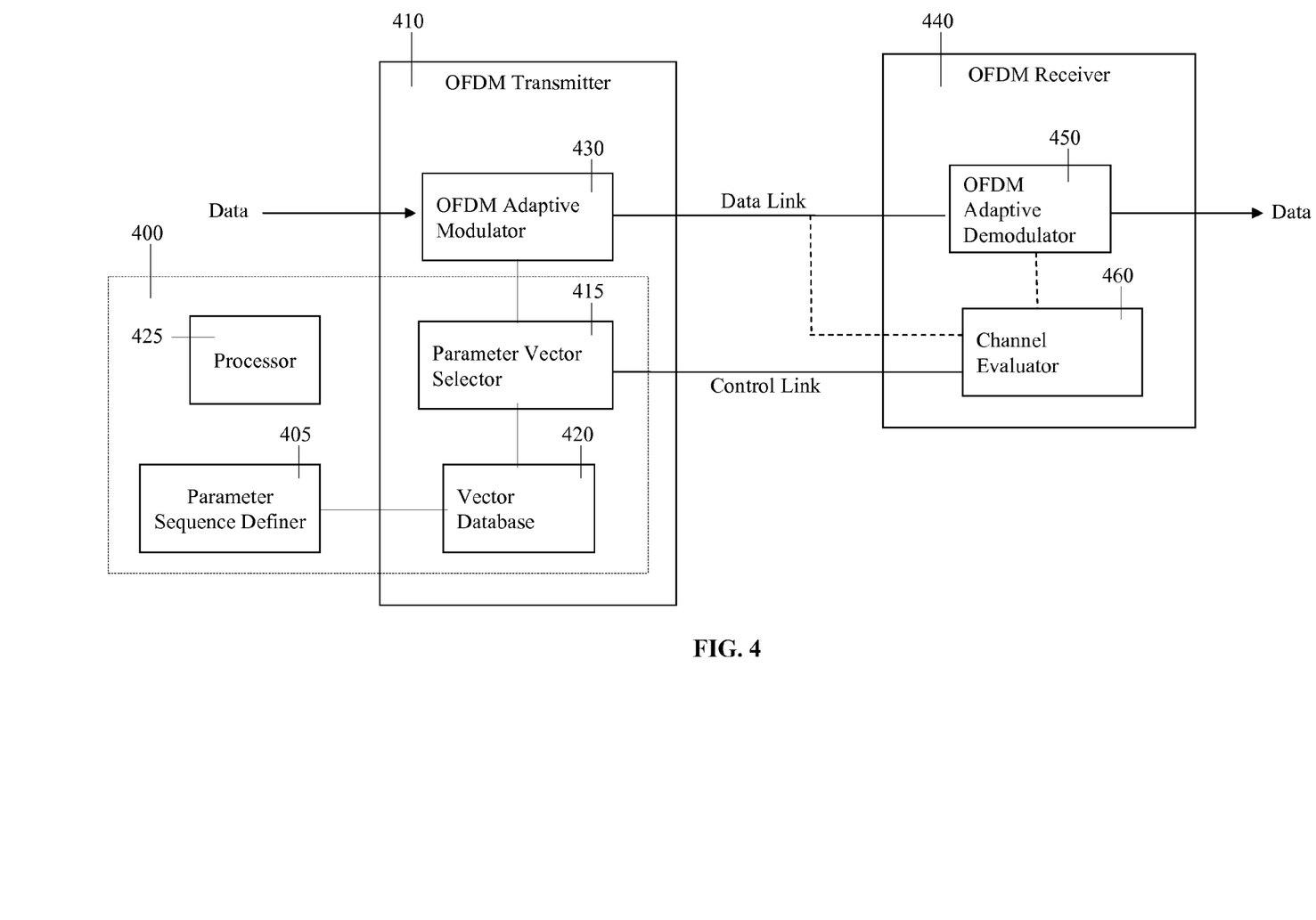
FIG. 4 is a simplified block diagram of an apparatus for controlling rate adaptation of transmissions in a substantially line-of-sight OFDM outdoor system, in accordance with an embodiment of the present invention.

Reference is now made to FIG. 4, which is a simplified block diagram of an apparatus for controlling rate adaptation of transmissions in a substantially line-of-sight OFDM outdoor system, in accordance with an embodiment of the present invention. The transmissions may be in the mm-wave or the microwave frequency band. FIG. 4 further illustrates an exemplary embodiment in which apparatus 400 is incorporated into an OFDM communication system, in order to perform rate adaptation control.

Apparatus 400 includes Parameter Sequence Definer 405, Parameter Vector Selector 415 and Vector Database 420. Apparatus 400 also includes a Processor 425 which operates the other apparatus components.

Parameter Sequence Definer 405 defines a sequence of parameter changes to dynamically adjust transmission quality for the rate adaptation. The sequence selected by Parameter Sequence Definer 405 is stored in Vector Database 420 as a table of vectors. Parameter Vector Selector 415 inputs the channel quality estimator, and retrieves the corresponding parameter vector from Vector Database 420.

In one embodiment the vector parameters include bandwidth and at least one other parameter. In other embodiments the vector parameters include PA backoff and at least one other parameter. In yet other embodiments the adaptable parameter is bandwidth alone.

Apparatus 400 may be incorporated all or in part into OFDM Transmitter 410 and/or OFDM Receiver 440.

In the exemplary embodiment of FIG. 4, OFDM Transmitter 410, OFDM Adaptive Modulator 430, Parameter Vector Selector 415 and Vector Database 435. Parameter Sequence Definer 405 is external to OFDM Transmitter 410, and loads the selected sequence into Vector Database 435 within the transmitter.

Parameter Vector Selector 415 provides the current parameter vector to OFDM modulator 430. OFDM modulator 430 adjusts the modulation parameters according to the provided parameter vector, and modulates the data signal onto the RF OFDM carrier accordingly. The modulation parameters are typically provided to OFDM Receiver 440 for demodulation of the received signal.

OFDM Receiver 440 includes OFDM Adaptive Demodulator 450 and Channel Evaluator 460. OFDM Adaptive Demodulator 450 demodulates the received RF signal in accordance with the current parameter vector. Channel evaluator 460 determines the received signal quality, and derives the channel quality estimator which is provided to OFDM Transmitter 410 over the control link. The decision to change parameter vectors may be made either on the OFDM Receiver side or on the OFDM Transmitter side.

The data link (carrying the transmitted data) and the control link (carrying control information such as the channel quality estimator and/or current parameter vector) may be transmitted over separate RF channels, or the control link may be implemented inline the data link over a single RF channel.

In some embodiments OFDM Transmitter 410 and/or OFDM Receiver 440 have all-silicon construction. Silicon construction does not require complex passive filters (and the associated trimmings) that are otherwise required to maintain the transmission spectrally-flat over the operating channel bandwidth. The system hardware may thus be more easily and economically designed and manufactured.

In one embodiment, Parameter Vector Selector 415 selects the current parameter vector as follows. When the link is established Parameter Vector Selector 415 selects a startup parameter vector without channel quality estimator data. For example, Parameter Vector Selector 415 may assume worst case conditions, and selected vector includes the most robust modulation, highest error correction ratio, maximum repetition ratio and lowest channel bandwidth. If the transmission quality improves, the parameter vector is changed to improve throughput. When the transmission quality decreases the parameters are changed in the reverse order.

The above described embodiments perform rate adaptation at mm-wave and microwave radio frequencies. OFDM modulation has a large number of adaptable modulation parameters, particularly in comparison to the more simple modulation techniques typically used at these frequencies. The disadvantages experienced by OFDM modulation at mm-wave and microwave frequencies may be alleviated by multiple-dimension rate adaptation which provides strong compensation for changes in channel conditions.

Various embodiments and aspects of the present invention as delineated hereinabove and as claimed in the claims section below find calculated support in the following examples.

EXAMPLES

Reference is now made to the following examples, which together with the above descriptions illustrate some embodiments of the invention in a non limiting fashion.

Figure 5:
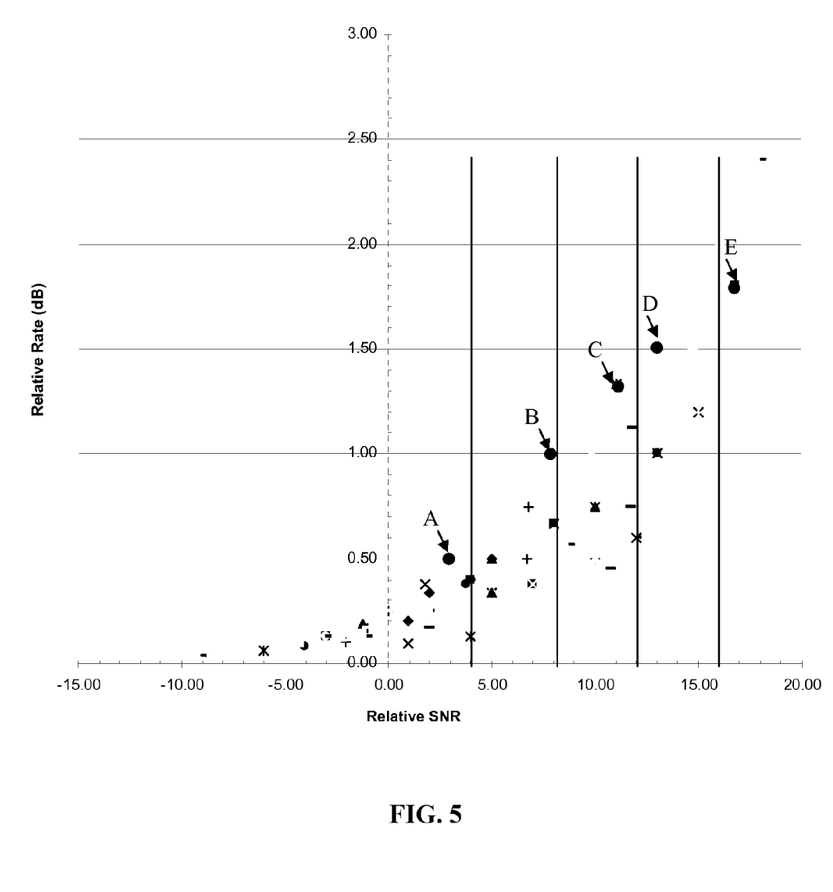
FIG. 5 is a graph of the simulated performance of an OFDM communication system with rate adaptation, according to an exemplary embodiment of the present invention.

Reference is now made to FIG. 5, which is a graph of the simulated performance of an OFDM communication system under varying channel conditions. In this example, the Relative SNR is the channel quality estimator (X-axis), and the Relative Rate serves as the performance measure (Y-axis). Each point on the graph corresponds to a parameter vector. When two parameter vectors lie on the same X-axis coordinate, the parameter vector with the higher Y-axis coordinate is selected, as it provides the best performance under the same channel conditions.

The graph has been divided into five SNR ranges. The parameter vector having the highest data throughput has been marked in each SNR range.

Table 1 shows the parameter values for each of points A-E. The Sub-channels parameter serves as the bandwidth parameter, and selects either three or four sub-channels for transmission.

TABLE 1

| Vector | Modulation | Rate | Repetitions | Sub-channels | Relative SNR | Relative Rate |
|---|---|---|---|---|---|---|
| A | 1.00 | 0.50 | 1.00 | 4.00 | 3.00 | 0.50 |
| B | 2.00 | 0.50 | 1.00 | 4.00 | 7.00 | 0.67 |
| C | 2.00 | 0.67 | 1.00 | 4.00 | 11.00 | 1.33 |
| D | 3.00 | 0.50 | 1.00 | 4.00 | 13.00 | 1.50 |
| E | 3.00 | 0.80 | 1.00 | 3.00 | 16.75 | 1.80 |

The selected parameter vectors A-E are stored for use in multi-dimensional rate adaptation during transmission (see 130 of FIG. 1). For example, if the current channel quality estimator indicates that the channel's relative SNR is between 8-12 parameter then vector C is chosen for transmission. Vector C specifies that the transmitted OFDM signal has a modulation of 2, a rate of 0.67, a single repetition and operates with four sub-channels.

A second exemplary embodiment is shown in Table 2. In Table 2, the channel quality estimator used is the Relative SNR. Modem parameters are: Modulation, Bandwidth (number of sub-channels), Repetition, FEC rate and number of FEC iterations on receiver.

In the present example, the multi-dimensional rate adaptation selects between fourteen different parameter vectors, each associated with a respective range of Relative SNR. These parameter sets have a throughput range from 8 Mbps to 384 Mbps and a relative SNR from 0 to 23 dB. With a throughput greater than 300 Mbps the OFDM Receiver is unable to perform more than 3 FEC iterations.

TABLE 2

| Vector | Modulation | Sub channels | Repetition | FEC rate | FEC Iterations | Throughput (Mbps) Half Dup. | Relative SNR |
|---|---|---|---|---|---|---|---|
| 0 | QPSK | 1 | 4 | 0.5 | 4 | 8 | 0 |
| 1 | QPSK | 2 | 4 | 0.5 | 4 | 16 | 3 |
| 2 | QPSK | 3 | 4 | 0.5 | 4 | 24 | 4.8 |
| 3 | QPSK | 4 | 4 | 0.5 | 4 | 32 | 6 |
| 4 | QPSK | 3 | 2 | 0.5 | 4 | 48 | 7.8 |
| 5 | QPSK | 4 | 2 | 0.5 | 4 | 64 | 9 |
| 6 | QPSK | 3 | 1 | 0.5 | 4 | 96 | 10.8 |
| 7 | QPSK | 4 | 1 | 0.5 | 4 | 128 | 12 |
| 8 | QPSK | 4 | 1 | 0.67 | 4 | 170.67 | 14 |
| 9 | QPSK | 4 | 1 | 0.8 | 4 | 204.8 | 16 |
| 10 | QAM16 | 4 | 1 | 0.5 | 4 | 248.32 | 17.5 |
|  | QAM16 | 4 | 1 | 0.67 | 4 | 341.33 | FEC limit |
| 11 | QAM16 | 4 | 1 | 0.67 | 3 | 341.33 | 21 |
|  | QAM64 | 4 | 1 | 0.5 | 4 | 384 | FEC limit |
| 12 | QAM64 | 4 | 1 | 0.5 | 3 | 384 | 23 |

The half-duplex throughput was calculated assuming the following conditions:

The OFDM link is bi-directional.

The control channel is implemented inline the data channel.

Rate adaptation control is implemented on the OFDM Transmitter, with the channel quality measurement obtained from the counterpart OFDM Receiver.

The transmission is performed in frames of 1 millisecond (ms.) each.

When the local OFDM Receiver on each side does not succeed in decoding a frame it is assumed the link has failed and the OFDM Transmitter goes immediately to its worst case state.

It is expected that during the life of a patent maturing from this application many relevant OFDM modulation parameters, OFDM transmission techniques and rate adaptation techniques will be developed, and the scope of the terms modulation parameter, OFDM transmission and rate adaptation are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, wherein said at least one other parameter comprises one of:

error correction rate, repetition rate, transmission power, modulation type, power amplifier (PA) backoff, number of OFDM sub-channels, sub-carrier repetitions, number of error correction iterations, selection of OFDM sub-carriers to be modulated and method of coding.

2. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, wherein said sequence defines a predetermined granularity of said channel quality estimator.

3. A method according to claim 2, wherein said granularity is 1.0 dB.

4. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, wherein said RF channel is line-of-sight.

5. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, wherein said RF channel is near line-of-sight.

6. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, further comprising associating each one of said stored parameter vectors with a separate range of said channel quality estimator.

7. A method according to claim 6, wherein said associating comprises selecting for each of said ranges a parameter vector which maximizes a specified performance measure for said range.

8. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation and comprising dynamic adaptation of bandwidth, storing said sequence as a table of bandwidths, and dynamically working through said bandwidths in said table in response to said channel quality estimator, wherein said sequence defines a predetermined granularity of said channel quality estimator.

9. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation and comprising dynamic adaptation of bandwidth, storing said sequence as a table of bandwidths, and dynamically working through said bandwidths in said table in response to said channel quality estimator, wherein said RF channel is line-of-sight.

10. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation and comprising dynamic adaptation of bandwidth, storing said sequence as a table of bandwidths, and dynamically working through said bandwidths in said table in response to said channel quality estimator, wherein said RF channel is near line-of-sight.

11. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation, and comprising dynamic adaptation of power amplifier (PA) backoff and at least one other parameter, storing said sequence as a table of vectors, one parameter of said vectors being PA backoff, each vector comprising a combination of parameters, and dynamically working through said parameter vectors in said table in response to said channel quality estimator, wherein said at least one other parameter comprises one of:

error correction rate, repetition rate, transmission power, modulation type, number of OFDM sub-channels, sub-carrier repetitions, number of error correction iterations, selection of OFDM sub-carriers to be modulated, method of coding and bandwidth.

12. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation, and comprising dynamic adaptation of power amplifier (PA) backoff and at least one other parameter, storing said sequence as a table of vectors, one parameter of said vectors being PA backoff, each vector comprising a combination of parameters, and dynamically working through said parameter vectors in said table in response to said channel quality estimator, wherein said sequence defines a predetermined granularity of said channel quality estimator.

13. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation, and comprising dynamic adaptation of power amplifier (PA) backoff and at least one other parameter, storing said sequence as a table of vectors, one parameter of said vectors being PA backoff, each vector comprising a combination of parameters, and dynamically working through said parameter vectors in said table in response to said channel quality estimator, wherein said RF channel is line-of-sight.

14. A method for performing rate adaptation of millimeter wave transmissions in a substantially line-of-sight OFDM outdoor system, wherein said millimeter wave transmissions are performed over a radio frequency (RF) channel, comprising:

receiving a channel quality estimator indicative of a quality of an outdoor millimeter-wave RF channel;

defining a sequence of parameter changes to dynamically adjust transmission quality for said rate adaptation, said parameters defining said rate adaptation, and comprising dynamic adaptation of power amplifier (PA) backoff and at least one other parameter, storing said sequence as a table of vectors, one parameter of said vectors being PA backoff, each vector comprising a combination of parameters, and dynamically working through said parameter vectors in said table in response to said channel quality estimator, wherein said RF channel is near line-of-sight.

15. A method for performing rate adaptation of microwave transmissions in a substantially line-of-sight OFDM outdoor system, wherein said microwave transmissions are performed over a radio frequency (RF) channel, comprising:

receiving a channel quality estimator indicative of a quality of an outdoor microwave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, wherein said at least one other parameter comprises one of:

error correction rate, repetition rate, transmission power, modulation type, power amplifier (PA) backoff, number of OFDM sub-channels, sub-carrier repetitions, number of error correction iterations, selection of OFDM sub-carriers to be modulated and method of coding.

16. A method for performing rate adaptation of microwave transmissions in a substantially line-of-sight OFDM outdoor system, wherein said microwave transmissions are performed over a radio frequency (RF) channel, comprising:

receiving a channel quality estimator indicative of a quality of an outdoor microwave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, wherein said sequence defines a predetermined granularity of said channel quality estimator.

17. A method for performing rate adaptation of microwave transmissions in a substantially line-of-sight OFDM outdoor system, wherein said microwave transmissions are performed over a radio frequency (RF) channel, comprising:

receiving a channel quality estimator indicative of a quality of an outdoor microwave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, wherein said RF channel is line-of-sight.

18. A method for performing rate adaptation of microwave transmissions in a substantially line-of-sight OFDM outdoor system, wherein said microwave transmissions are performed over a radio frequency (RF) channel, comprising:

receiving a channel quality estimator indicative of a quality of an outdoor microwave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, wherein said RF channel is near line-of-sight.

19. A method for performing rate adaptation of millimeter wave transmissions in an OFDM indoor system, wherein said millimeter wave transmissions are performed over a radio frequency (RF) channel, comprising:

receiving a channel quality estimator indicative of a quality of a millimeter-wave RF channel;

defining a sequence of parameter changes to dynamically adjust transmission quality for said rate adaptation, said parameters defining said rate adaptation, and comprising dynamic adaptation of bandwidth and at least one other parameter, storing said sequence as a table of vectors, one parameter of said vectors being bandwidth, each vector comprising a combination of parameters, and dynamically working through said parameter vectors in said table in response to said channel quality estimator, wherein said at least one other parameter comprises one of:
error correction rate, repetition rate, transmission power, modulation type, power amplifier (PA) backoff, number of OFDM sub-channels, sub-carrier repetitions,
number of error correction iterations, selection of OFDM sub-carriers to be modulated and method of coding.

20. A method for performing rate adaptation of millimeter wave transmissions in an OFDM indoor system, wherein said millimeter wave transmissions are performed over a radio frequency (RF) channel, comprising:
receiving a channel quality estimator indicative of a quality of a millimeter-wave RF channel;
defining a sequence of parameter changes to dynamically adjust transmission quality for said rate adaptation, said parameters defining said rate adaptation, and comprising dynamic adaptation of bandwidth and at least one other parameter,
storing said sequence as a table of vectors, one parameter of said vectors being bandwidth, each vector comprising a combination of parameters, and
dynamically working through said parameter vectors in said table in response to said channel quality estimator, wherein said sequence defines a predetermined granularity of said channel quality estimator.

21. An apparatus for controlling rate adaptation of transmissions in a substantially line-of-sight OFDM outdoor system, wherein said transmissions are performed over a radio frequency (RF) channel in the mm-wave or microwave frequency band, comprising:

a parameter sequence definer, configured for defining a sequence of parameter changes to dynamically adjust transmission quality for said rate adaptation, said parameters defining said rate adaptation, and comprising dynamic adaptation of bandwidth and at least one other parameter;
a vector database associated with said parameter sequence definer, configured for storing said sequence as a table of vectors, one parameter of said vectors being bandwidth, each vector comprising a combination of parameters;
a parameter vector selector associated with said vector database, configured for receiving a channel quality estimator indicative of a quality of an outdoor millimeter-wave RF channel, for dynamically working through said parameter vectors in said table in response to said channel quality estimator so as to select a parameter vector for modulating an RF carrier; and
a processor configured for operating said parameter sequence definer, said vector database and said parameter vector selector.

22. An apparatus in accordance with claim 21, wherein said RF channel is line-of-sight.

23. An apparatus in accordance with claim 21, wherein said RF channel is near line-of-sight.

24. An apparatus in accordance with claim 21, further comprising an RF modulator configured for OFDM modulating a mm-wave RF carrier in accordance with said selected parameter vector.

* * * * *